US012682672B2

(12) United States Patent
Bittmann

(10) Patent No.: US 12,682,672 B2
(45) Date of Patent: Jul. 14, 2026

(54) IDENTIFYING DOCUMENT GENERATORS BY COLOR FOOTPRINTS

(71) Applicant: SAP SE, Walldorf (DE)

(72) Inventor: Ran Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 382 days.

(21) Appl. No.: 17/883,147

(22) Filed: Aug. 8, 2022

(65) Prior Publication Data

US 2024/0046679 A1     Feb. 8, 2024

(51) Int. Cl.
*G06V 30/19*          (2022.01)
*G06V 30/18*          (2022.01)

(52) U.S. Cl.
CPC .. *G06V 30/19147* (2022.01); *G06V 30/18095* (2022.01); *G06V 30/18105* (2022.01); *G06V 30/19173* (2022.01)

(58) Field of Classification Search
None
See application file for complete search history.

(56) References Cited

U.S. PATENT DOCUMENTS

| | | | |
|---|---|---|---|
| 4,910,787 A | | 3/1990 | Umeda et al. |
| 5,739,512 A | * | 4/1998 | Tognazzini .............. G07G 5/00 |
| | | | 235/380 |
| 5,974,412 A | | 10/1999 | Hazlehurst et al. |
| 6,029,144 A | | 2/2000 | Barrett et al. |
| 6,301,386 B1 | | 10/2001 | Zhu et al. |

| | | |
|---|---|---|
| 6,754,380 B1 | 6/2004 | Suzuki et al. |
| 7,003,494 B2 | 2/2006 | Beach et al. |
| 8,051,019 B2 | 11/2011 | Sigal et al. |
| 8,185,909 B2 | 5/2012 | Sigal et al. |
| 8,498,976 B1 | 7/2013 | Shanken et al. |
| 8,538,965 B1 | 9/2013 | Talyansky et al. |

(Continued)

FOREIGN PATENT DOCUMENTS

| | | |
|---|---|---|
| CN | 111311550 | 6/2020 |
| WO | 2008119531 | 10/2008 |

OTHER PUBLICATIONS

Khandan "An Intelligent Hybrid Model for Identity Document Classification," arXiv:2106.04345v1 [cs.CV], Jun. 7, 2021 (Year: 2021).*

(Continued)

*Primary Examiner* — Michelle M Koeth
(74) *Attorney, Agent, or Firm* — Fish & Richardson P.C.

(57)          ABSTRACT

The present disclosure involves systems, software, and computer implemented methods for identifying document generators by color footprints. An example method includes receiving a request to classify a first document. A document footprint is generated for the first document that includes a set of most frequently occurring color values in the first document. A classification for the first document is determined as either generated-by-the-document-generator or not-generated-by-the-document-generator based on comparing the document footprint for the first document to a document generator footprint. The document generator footprint includes a set of common color values that occur in a set of training documents for the document generator. The classification for the first document is provided in response to the request.

21 Claims, 6 Drawing Sheets

(56)　　　　　References Cited

U.S. PATENT DOCUMENTS

| | | | |
|---|---|---|---|
| 8,793,191 | B2 | 7/2014 | Abernethy et al. |
| 9,286,514 | B1 | 3/2016 | Newman |
| 9,671,237 | B1 | 6/2017 | Eliassi et al. |
| 9,672,495 | B2 | 6/2017 | Bittmann |
| 9,973,789 | B1 | 5/2018 | Bittmann et al. |
| 10,043,071 | B1 | 8/2018 | Wu |
| 10,457,086 | B2 | 10/2019 | Jones et al. |
| 10,515,266 | B1 | 12/2019 | Jarvis et al. |
| 10,685,347 | B1 | 6/2020 | Edwards et al. |
| 10,692,000 | B2 | 6/2020 | Surazhsky et al. |
| 10,733,733 | B1 | 8/2020 | Nam |
| 10,810,725 | B1 | 10/2020 | Dolhansky et al. |
| 10,817,733 | B2 | 10/2020 | Boue et al. |
| 10,949,852 | B1 | 3/2021 | Kramme et al. |
| 10,964,006 | B2 | 3/2021 | Niessner et al. |
| 11,113,689 | B2 | 9/2021 | Stark et al. |
| 11,308,492 | B2 | 4/2022 | Lind et al. |
| 11,645,626 | B2 * | 5/2023 | Mihai ............... G06Q 30/0201 705/7.29 |
| 2002/0194174 | A1 | 12/2002 | Calkins et al. |
| 2003/0215136 | A1 | 11/2003 | Chao et al. |
| 2004/0081332 | A1 | 4/2004 | Tuttle et al. |
| 2005/0033617 | A1 | 2/2005 | Prather et al. |
| 2005/0222929 | A1 | 10/2005 | Steier et al. |
| 2007/0194103 | A1 | 8/2007 | Manheim |
| 2010/0284623 | A1 * | 11/2010 | Chen ................... G06V 30/414 382/224 |
| 2011/0158483 | A1 | 6/2011 | Ming et al. |
| 2012/0230560 | A1 | 9/2012 | Spitz et al. |
| 2013/0044953 | A1 | 2/2013 | Du |
| 2013/0050764 | A1 | 2/2013 | Zhan et al. |
| 2013/0170749 | A1 | 7/2013 | Tian |
| 2014/0002722 | A1 | 1/2014 | Cook et al. |
| 2014/0185933 | A1 | 7/2014 | Tian et al. |
| 2015/0067346 | A1 | 3/2015 | Ross et al. |
| 2015/0379345 | A1 | 12/2015 | Thompson et al. |
| 2016/0358268 | A1 | 12/2016 | Verma et al. |
| 2017/0011096 | A1 | 1/2017 | Bittmann |
| 2017/0286765 | A1 | 10/2017 | Rodriguez |
| 2017/0296421 | A1 * | 10/2017 | Travers .............. G02B 27/0172 |
| 2018/0268250 | A1 | 9/2018 | Drozdova et al. |
| 2018/0268584 | A1 | 9/2018 | Bobovich et al. |
| 2019/0197358 | A1 | 6/2019 | Madani et al. |
| 2019/0236614 | A1 | 8/2019 | Burgin et al. |
| 2019/0266474 | A1 | 8/2019 | Stark et al. |
| 2019/0295223 | A1 | 9/2019 | Shen et al. |
| 2019/0318347 | A1 | 10/2019 | Aguiar et al. |
| 2019/0385003 | A1 | 12/2019 | Elgammal |
| 2020/0005222 | A1 | 1/2020 | Bittmann |
| 2020/0097724 | A1 | 3/2020 | Chakravarty et al. |
| 2020/0104992 | A1 | 4/2020 | Schumacher et al. |
| 2020/0110932 | A1 | 4/2020 | Berger |
| 2020/0151938 | A1 | 5/2020 | Shechtman et al. |
| 2020/0160502 | A1 | 5/2020 | Niessner et al. |
| 2020/0210770 | A1 | 7/2020 | Bala et al. |
| 2020/0226410 | A1 | 7/2020 | Liu et al. |
| 2020/0311996 | A1 * | 10/2020 | Day-Richter ......... G06T 11/001 |
| 2020/0349682 | A1 | 11/2020 | Mayol Cuevas et al. |
| 2020/0387700 | A1 | 12/2020 | Wu |
| 2021/0004580 | A1 | 1/2021 | Sundararaman et al. |
| 2021/0004795 | A1 | 1/2021 | Stark et al. |
| 2021/0004810 | A1 * | 1/2021 | Lind ................... G06Q 20/389 |
| 2021/0004912 | A1 | 1/2021 | Stark et al. |
| 2021/0004949 | A1 | 1/2021 | Broyda et al. |
| 2021/0019519 | A1 | 1/2021 | Martin et al. |
| 2021/0034861 | A1 | 2/2021 | Roebuck |
| 2021/0052215 | A1 | 2/2021 | Mouton et al. |
| 2021/0124919 | A1 | 4/2021 | Balakrishnan et al. |
| 2021/0158036 | A1 | 5/2021 | Huber, Jr. |
| 2021/0311947 | A1 | 10/2021 | Bittmann et al. |
| 2021/0385502 | A1 | 12/2021 | Dinh et al. |
| 2021/0398118 | A1 | 12/2021 | Stark et al. |
| 2022/0043788 | A1 | 2/2022 | Bittmann et al. |
| 2022/0172204 | A1 | 6/2022 | Stark et al. |
| 2022/0237604 | A1 | 7/2022 | Lind et al. |
| 2022/0237605 | A1 | 7/2022 | Lind et al. |
| 2022/0237606 | A1 | 7/2022 | Lind et al. |
| 2023/0162292 | A1 | 5/2023 | Sundararaman et al. |

OTHER PUBLICATIONS

U.S. Appl. No. 16/577,821, Stark et al.

U.S. Appl. No. 16/577,997, Stark et al.

U.S. Appl. No. 16/578,016, Stark et al.

Artaud et al., "Find it! fraud detection contest report." 2018 24th International Conference on Pattern Recognition (ICPR). IEEE, Aug. 2018, 6 pages.

Asghar et al., "Edge-texture feature-based image forgery detection with cross-dataset evaluation" Machine Vision and Applications 30.7, Oct. 2019, 33 pages.

Beusekonn et al., "Distortion Measurement for Automatic Document Verification" International Conference on Document Analysis and Recognition, Sep. 2011, 5 pages.

Bloomberg et al., "Blur hit-miss transform and its use in document image pattern detection" Document Recognition II. vol. 2422. International Society for Optics and Photonics, Mar. 1995, 14 pages.

Devi et al., "A survey of image processing techniques for identification of printing technology in document forensic perspective" Int. J. Comput. Appl 1.1, 2010, 7 pages.

Expensereceipt.com [online], "Expense Receipt" Jan. 10, 2016, [retrieved on Jul. 25, 2022], retrieved from : URL <http://www.expensereceipt.com/>, 1 page.

Extended European Search Report issued in European Application No. 20183783.8 on Dec. 4, 2020, 10 pages.

Final Office Action issued in U.S. Appl. No. 16/711,642 on Jul. 14, 2022, 18 pages.

Final Office Action issued in U.S. Appl. No. 16/711,679 on Aug. 25, 2021, 37 pages.

Gebhardt et al., "Document authentication using printing technique features and unsupervised anomaly detection" 2013 12th International conference on document analysis and recognition. IEEE, Aug. 2013, 5 pages.

Hrudya et al., "Digital Image Forgery Detection on Artificially Blurred Images" Annrita Center for Cyber Security, Oct. 2017, 5 pages.

Jain et al., "Fake Currency Note Identification Using Deep Convolutional Neural Networks" International Journal of Computing and Applications, vol. 13, No. 2, Jul.-Dec. 2018, 5 pages.

Non-Final Office Action issued in U.S. Appl. No. 16/711,642 on Dec. 15, 2021, 27 pages.

Non-Final Office Action issued in U.S. Appl. No. 16/711,679 on Apr. 21, 2021, 36 pages.

Park et al., "An Edge Based Block Segmentation and Classification for Document Analysis with Automatic Character String Extraction," Kyungpook National University, Korea, Oct. 1996, 6 pages.

Zhu et al., "Extracting relevant named entities for automated expense reimbursement." Proceedings of the 13th ACM SIGKDD international conference on Knowledge discovery and data mining, Aug. 2007, 9 pages.

Joshi et al., "Source printer classification using printer specific local texture descriptor" CoRR, Submitted on Jun. 2018, arXiv:1806.06650v1, 25 pages.

Non-Final Office Action in U.S. Appl. No. 18/149,769, mailed on Jul. 20, 2023, 12 pages.

Office Action in European Appln. No. 20183783.8, mailed on Dec. 22, 2023, 6 pages.

Decision to Grant in European Appln. No. 20183783.8, mailed on Feb. 5, 2026, 4 pages.

* cited by examiner

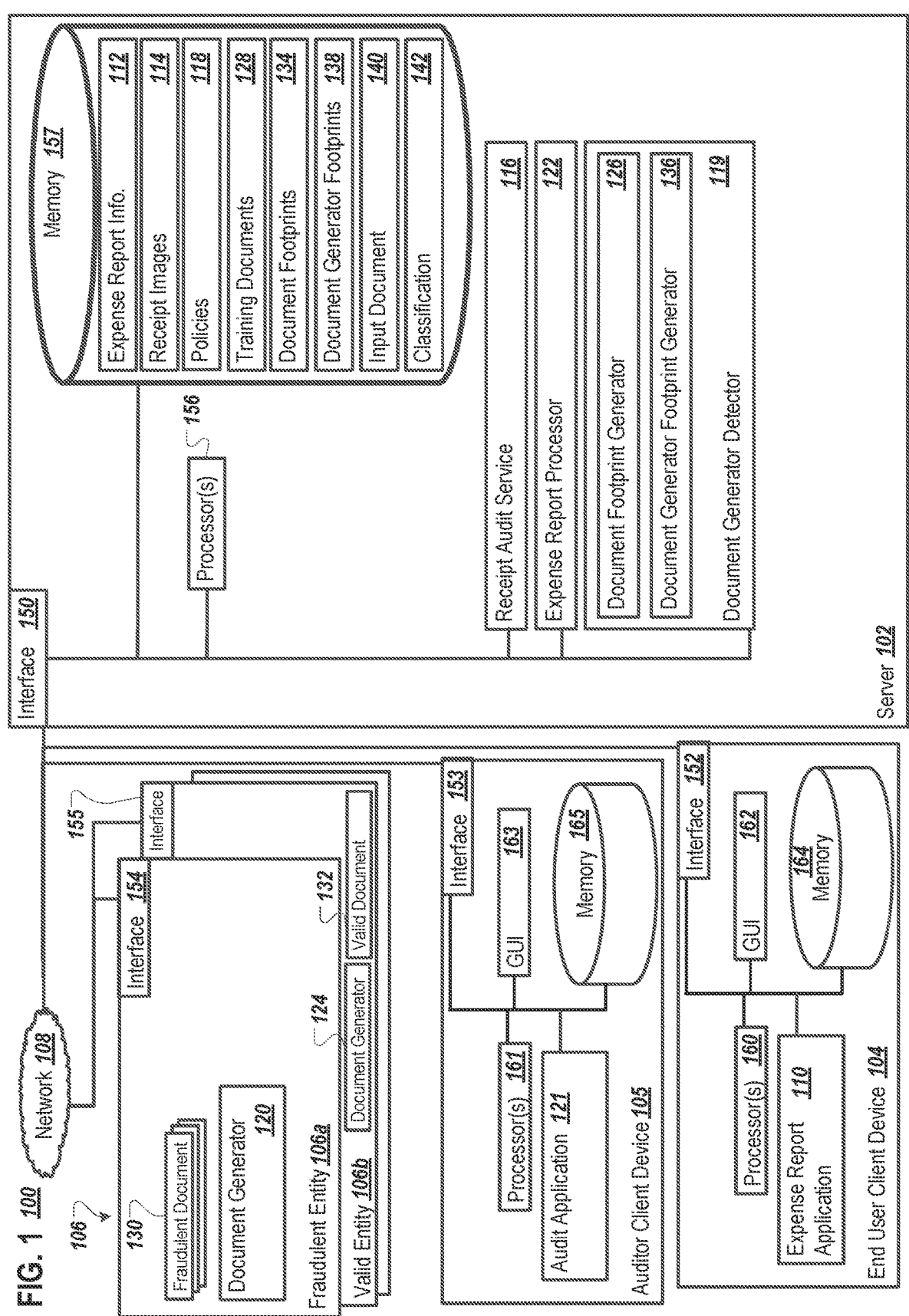
FIG. 1 *100*

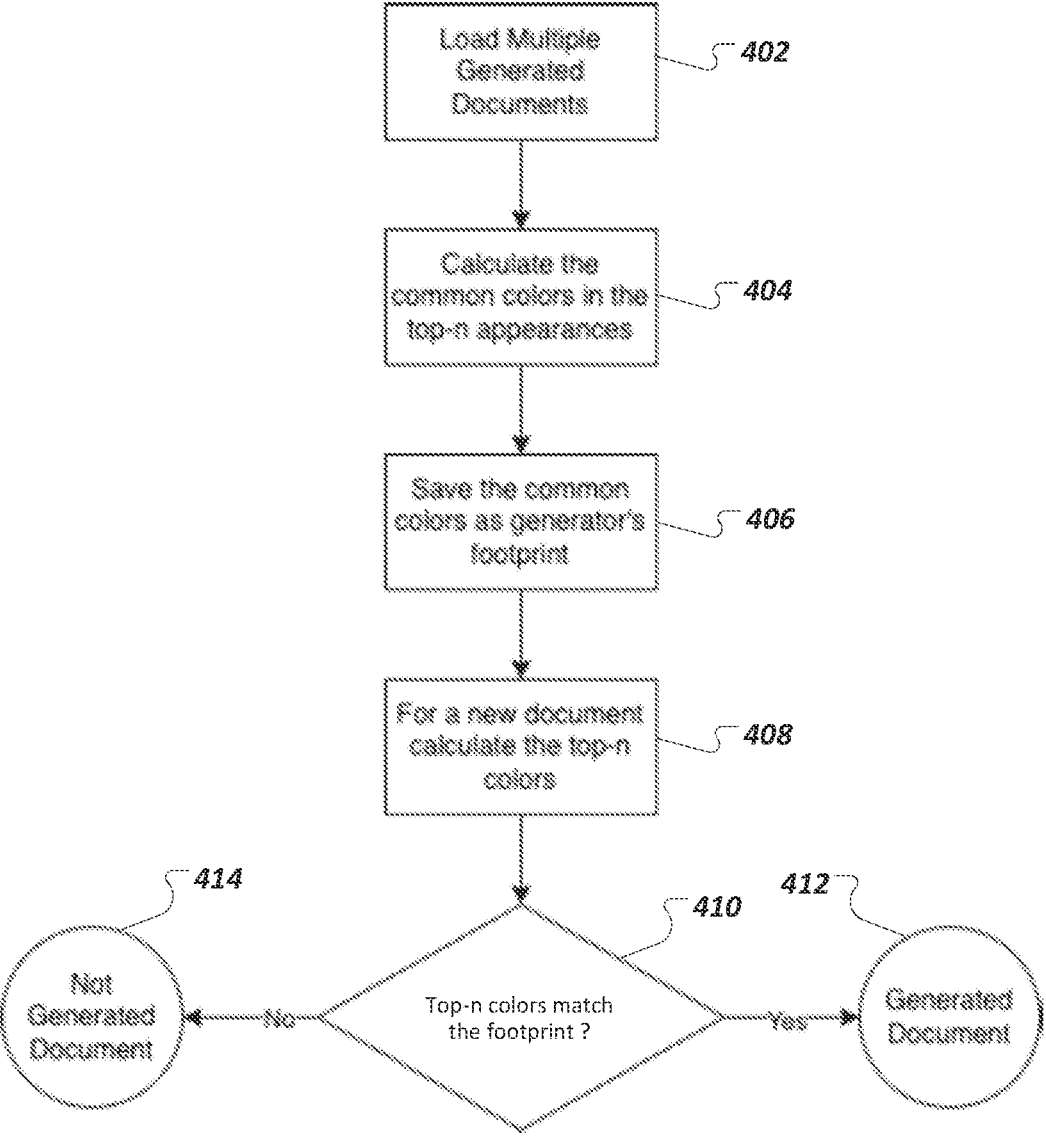
FIG. 4　　*400*

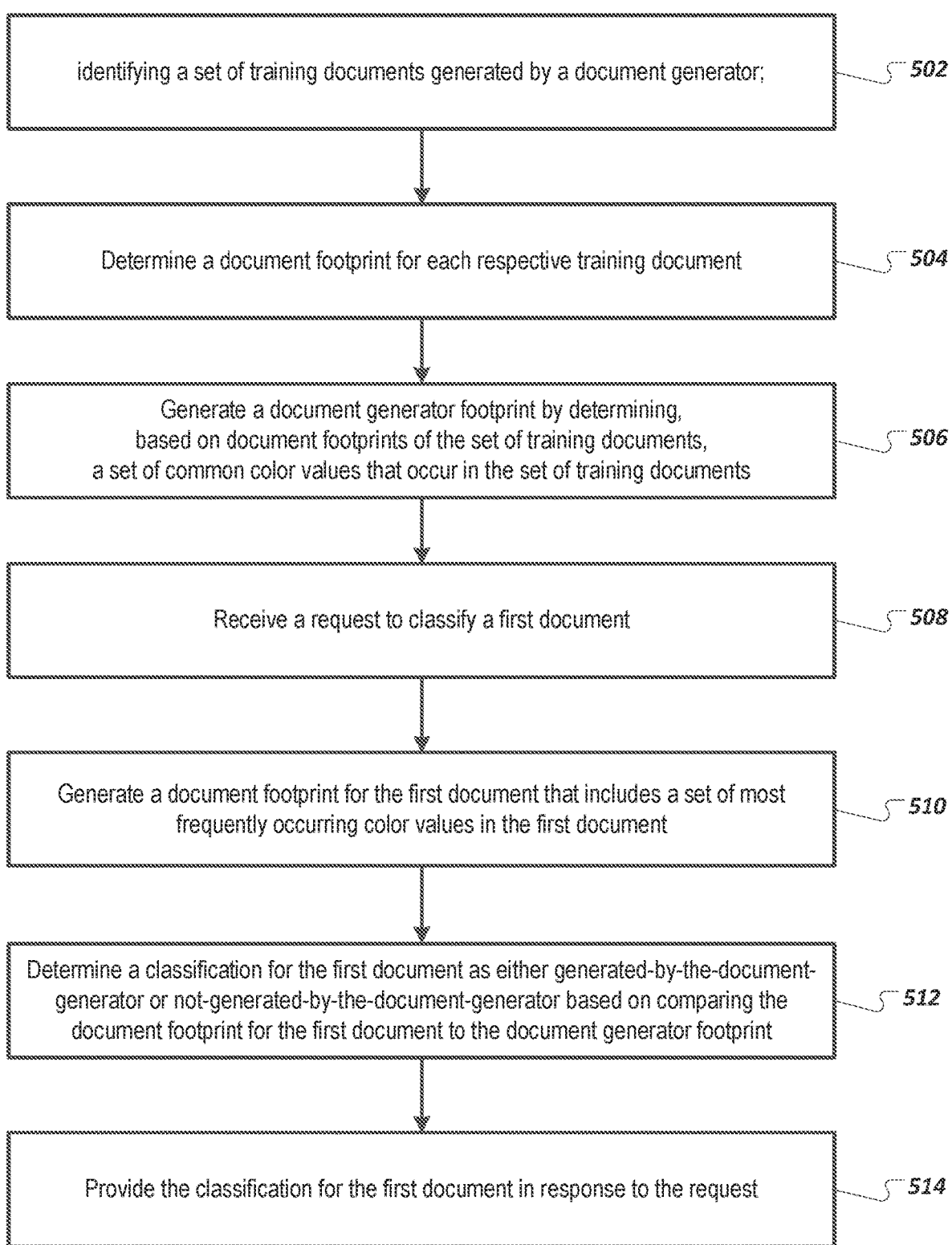

identifying a set of training documents generated by a document generator; — 502

Determine a document footprint for each respective training document — 504

Generate a document generator footprint by determining, based on document footprints of the set of training documents, a set of common color values that occur in the set of training documents — 506

Receive a request to classify a first document — 508

Generate a document footprint for the first document that includes a set of most frequently occurring color values in the first document — 510

Determine a classification for the first document as either generated-by-the-document-generator or not-generated-by-the-document-generator based on comparing the document footprint for the first document to the document generator footprint — 512

Provide the classification for the first document in response to the request — 514

FIG. 5    500

IDENTIFYING DOCUMENT GENERATORS BY COLOR FOOTPRINTS

TECHNICAL FIELD

The present disclosure relates to computer-implemented methods, software, and systems for identifying document generators by color footprints.

BACKGROUND

Travel and travel-related expenses can be a large expense for organizations. An automated expense management system can be used to analyze, monitor, and control travel and other reimbursable expenses, while maintaining accuracy and increasing worker productivity. An automated expense management system can enable employees to spend less time creating and monitoring expense reports, which can allows workers to spend more time on core job functions.

SUMMARY

The present disclosure involves systems, software, and computer implemented methods for identifying document generators by color footprints. One example method includes: identifying a set of training documents generated by a document generator; determining, for each respective training document, a document footprint for the respective training document that includes a set of most frequently occurring color values in the respective training document; generating a document generator footprint by determining, based on document footprints of the set of training documents, a set of common color values that occur in the set of training documents; receiving a request to classify a first document; generating a document footprint for the first document that includes a set of most frequently occurring color values in the first document; determining a classification for the first document as either generated-by-the-document-generator or not-generated-by-the-document-generator based on comparing the document footprint for the first document to the document generator footprint; and providing the classification for the first document in response to the request.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 1 is a block diagram illustrating an example system for identifying document generators by color footprints.

FIG. 4 is a flowchart of an example method for determining whether a document has been generated by a particular document generator.

FIG. 5 is a flowchart of an example method for identifying document generators by color footprints.

DETAILED DESCRIPTION

Figure 2A:
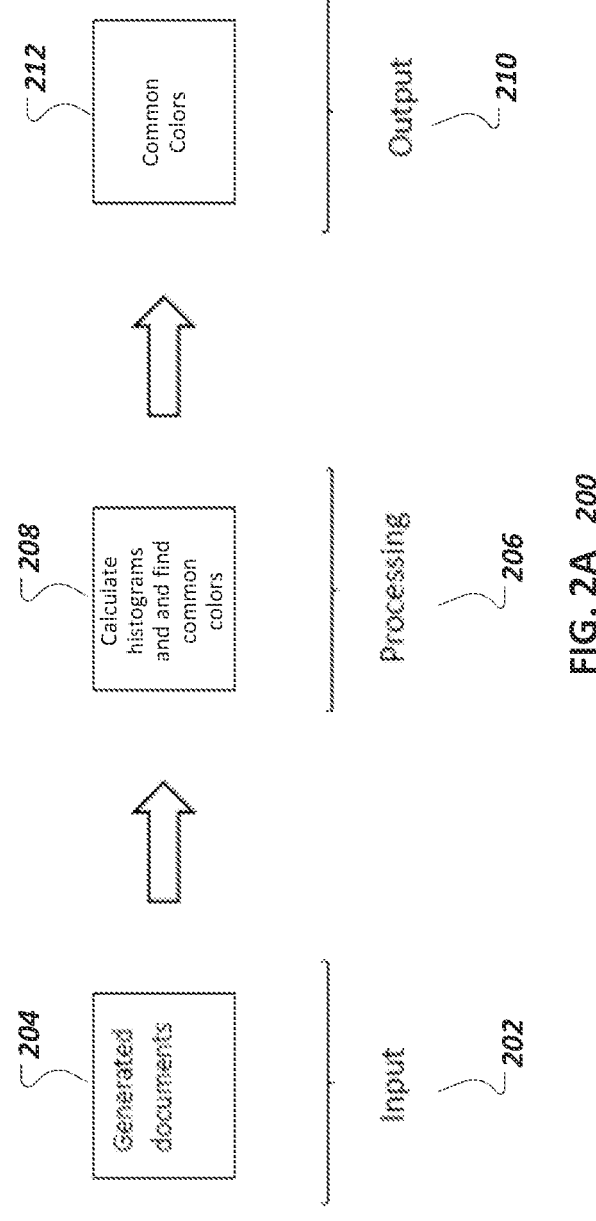
FIG. 2A illustrates an example process for generating a document generator footprint.

A software provider can deliver an expense reporting service to corporate customers. For example, expense, invoicing, auditing and other services can be offered. Expense and audit services can be coupled so that expense reports that are submitted also include a workflow step where the expense is audited. A compliance verification (e.g., audit), can include a receipt audit. A receipt audit can include verification of expense report claims and supporting documentation consistency and validity.

Validating supporting documentation can include using a machine learning color footprint approach to determine whether a receipt was automatically generated by a particular document generator. For example, for some valid expenses, a user may use a known, valid receipt generator (e.g., provided by an online merchant or entity). A receipt audit can determine that a provided receipt was provided by a known, valid generator. Accordingly, the receipt can be accepted as valid. As another example, a fraudulent user may use a suspicious receipt generator to generate a fake receipt. A receipt audit can determine that a provided receipt is a fake receipt generated by a known, suspicious generator. Accordingly, the receipt can be rejected as invalid.

In further detail, the machine learning approaches described herein can be used to detect cases of receipts generated by suspicious receipt generators. For example, the user may have used a fraudulent system or process to automatically generate a machine-generated receipt and attempted to submit the machine-generated receipt as an authentic receipt (e.g., the user may have claimed that they received the receipt as part of a transaction where they actually fraudulently generated the receipt and submitted a fraudulent claim). Machine learning models can be trained to detect fraudulent machine-generated receipts. Fraud detection can include, for example detection of fake receipts that are generated online and do not link to an actual transaction. Fake receipt (and other fake document detection) can be important for preventing revenue loss and for improving system accuracy and confidence.

Machine learning audit results can be triggered and reported at various time points, such as while a user is building an expense report (as well as after expense report submission). Flexible and real time (or near real time) feedback can improve a user experience. More immediate feedback can notify and make users more aware of auditing procedures that are being employed, which can lessen an occurrence of attempted fraudulent submissions.

FIG. 1 is a block diagram illustrating an example system 100 for expense report auditing. Specifically, the illustrated system 100 includes or is communicably coupled with a server 102, an end-user client device 104, an auditor client device 105, document generators 106 (e.g., including a fraudulent entity 106a and a valid entity 106b), and a network 108. Although shown separately, in some implementations, functionality of two or more systems or servers may be provided by a single system or server. In some implementations, the functionality of one illustrated system or server may be provided by multiple systems or servers.

A user can use an expense report application 110 on the end-user client device 104 to work on (and eventually submit) an expense report to the server 102. Expense report information 112 (for a submitted or a work-in progress expense report) and receipt images 114 can be received by the server 102.

A receipt audit service 116 can ensure that user-provided documentation, such as a receipt, backs up a claim that the user has submitted (or is working on). The receipt audit service 116 can verify, for example, that a date, an amount, a currency, a vendor name, a vendor location, and an expense type are supported by the user-provided documentation (e.g., receipt(s)). As another example, the receipt audit service 116 can determine whether the expense report information 112 violates any policies 118 that have been configured for an entity (e.g., company) associated with the user. As described in more detail below, the receipt audit service 116 can also use a document generator detector 119 to determine a validity or invalidity of a received receipt image 114 based on determining whether a particular document generator was likely used to generate the receipt image 114 and whether the determined document generator is a valid receipt generator (e.g., the valid entity 106*b*) or a known fraudulent receipt generator (e.g., the fraudulent entity 106*a*).

The receipt audit service 116 can generate an audit alert in response to determining various types of alert conditions for a submitted request. For example, the receipt audit service 116 can generate an audit alert in response to determining that an identified token in a receipt image 114 does not match a corresponding item in the expense report information 112, that the expense report information 112 or information in the receipt image 114 violates one or more policies, or that the receipt image 114 is invalid based on a determination that a fraudulent document generator (e.g., a document generator 120 used by the fraudulent entity 106*a*) likely generated the receipt image 114. Audit alerts can be provided to the end-user client device 104 for presentation in the expense report application 110. The user who provided the expense report information 112 can receive an alert when running the expense report application 110 in a user mode. A manager of the user can receive an alert in the expense report application 110 (e.g., on a different end-user client device 104) when running the expense report application 110 in an auditor or supervisor mode, for example. An auditor can view audit results in an audit application 121 on the auditor client device 105, for example. If an expense report item successfully passes audits that have been configured for the entity, the expense can be processed for the user, for example, by an expense report processor 122.

In further detail regarding the document generator detector 119, the document generator detector 119 can perform processing in a learning phase for different document generators such as the document generator 120 of the fraudulent entity 106*a* or a document generator 124 of the valid entity 106*b* (among other document generators). For example, a document footprint generator 126 can identify a set of training documents 128 generated by a particular document generator. A set of training documents 128 for a given document generator can include a predetermined number of documents (e.g., 5, 10, 20). Each training document for a given document generator can be a document is that known to have been generated by the document generator. For example, during a learning phase for the document generator 120, the training documents 128 for the document generator 120 can include a document 130 (among other documents). Similarly, during a learning phase for the document generator 124, the training documents 128 for the document generator 124 can include a document 132 (among other documents).

The training documents 128 can be images, such as receipt images. Although described as being used by the receipt audit service 116 for detecting whether a receipt has likely been generated by a particular document generator, the document generator detector 119 can be used to detect generation by generators of other types of documents other than receipts.

After identifying the training documents 128 for a particular document generator, the document footprint generator 126 can generate document footprints 134 (e.g., one document footprint 134 for each respective training document 128 used for the document generator). A document footprint 134 for a respective training document includes a set of most frequently occurring color values in the respective training document. Color values can be RGB color values, grayscale color values, or some other type of color value. When the documents are images, such as receipt images, the color values can be color values of image pixels in the receipt images.

In further detail, to generate a document footprint 134 for a training document, the document footprint generator 126 can generate a histogram of frequency counts of color values included in the training document, sort the histogram by color value frequency, and determine, as the document footprint 134, a set of most frequently occurring color values in the respective training document based on the sorted histogram.

After document footprints 134 have been generated in a learning phase for a document generator, a document generator footprint generator 136 can generate a document generator footprint 138 for the document generator. The document generator footprint generator 136 can generate the document generator footprint by determining, based on document footprints 134 of the training documents 128 for the document generator, a set of common color values that occur in the set of training documents. For example, the document generator footprint generator 136 can generate the document generator footprint by determining, as the set of common color values, a set of color values that are included in each document footprint 134 of the set of training documents 128 for the document generator.

The document generator footprint 138 can be used in an inference phase. For example, the document generator detector 119 can receive a request, from the receipt audit service 116, to determine whether a receipt image has been generated by a known fraudulent document generator (e.g., the document generator 120) or a known valid document generator (e.g., the document generator 124). The document generator detector 119 can perform an inference step for each of one or more document generators and can generate a classification of generated-by or not-generated-by for each document generator, for an input receipt image (or other input document).

In the inference phase for an input document 140 and a given document generator, the document generator detector 119 can use the document footprint generator 126 to generate a document footprint 134 for the input document (e.g., as described above for the training documents 128). The document footprint 134 for the input document 140 includes a set of most frequently occurring color values in the input document 140.

The document generator detector 119 can generate a classification 142 for the input document 140 for the document generator under consideration of either generated-bythe-document-generator or not-generated-by-the-document-generator based on comparing the document footprint 134 for the input document 140 to the document generator footprint 138 of the document generator. For example, the document generator detector 119 can determine whether each color value in the document generator footprint 138 is included in the document footprint 134 for the input document 140. If each color value in the document generator footprint 138 is included in the document footprint 134 for the input document 140, the document generator detector 119 can determine a classification of generated-by-the-document generator as the classification 142, otherwise the document generator detector 119 can determine a classification of not-generated-by-the-document generator as the classification 142.

If the document generator under consideration is known to be associated with a fraudulent entity such as the fraudulent entity 106*a* and the classification 142 is generated-by-the-document generator, the receipt audit service 116 can generate an audit alert. If the document generator under consideration is known to be associated with a valid entity such as the valid entity 106*b* and the classification 142 is generated-by-the-document generator, the receipt audit service 116 can generate an audit pass for at least an audit portion conducted by the document generator detector 119. If the classification 142 is not-generated-by-the-document-generator, the document generator detector 119 can perform the inference phase for the input document 140 for another document generator, if applicable.

As used in the present disclosure, the term "computer" is intended to encompass any suitable processing device. For example, although FIG. 1 illustrates a single server 102, a single end-user client device 104, and a single auditor client device 105, the system 100 can be implemented using a single, stand-alone computing device, two or more servers 102, or multiple devices. Indeed, the server 102, the end-user client device 104, and the auditor client device 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102, the client end-user client device 104, and the auditor client device 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 153, 154, and 155 are used by the server 102, the end-user client device 104, the auditor client device 105, the fraudulent entity 106*a*, and the valid entity 106*b*, respectively, for communicating with other systems in a distributed environment—including within the system 100—connected to the network 108. Generally, the interfaces 150, 152, 153, 154, and 155 each comprise logic encoded in software and/or hardware in a suitable combination and operable to communicate with the network 108. More specifically, the interfaces 150, 152, 153, 154, and 155 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from respective client devices, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including Python®, C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 157. In some implementations, the server 102 includes multiple memories. The memory 157 may include any type of memory or database module and may take the form of volatile and/or non-volatile memory including, without limitation, magnetic media, optical media, random access memory (RAM), read-only memory (ROM), removable media, or any other suitable local or remote memory component. The memory 157 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the auditor client device 105 may each generally be any computing device operable to connect to or communicate with the server 102 via the network 108 using a wireline or wireless connection. In general, the end-user client device 104 and the auditor client device 105 each comprise an electronic computer device operable to receive, transmit, process, and store any appropriate data associated with the system 100 of FIG. 1. The end-user client device 104 and the auditor client device 105 can each include one or more client applications, including the expense report application 110 or the audit application 121, respectively. A client application is any type of application that allows a respective client device to request and view content on the respective client device. In some implementations, a client application can use parameters, metadata, and other information received at launch to access a particular set of data from the server 102. In some instances, a client application may be an agent or client-side version of an application running on the server 102 or another server.

The end-user client device 104 and the auditor client device 105 respectively include processor(s) 160 or processor(s) 161. Each of the processor(s) 160 and 161 may be a central processing unit (CPU), an application specific integrated circuit (ASIC), a field-programmable gate array (FPGA), or another suitable component. Generally, each of the processor(s) 160 and 161 executes instructions and manipulates data to perform the operations of the respective client device. Specifically, each of the processor(s) 160 and 161 executes the functionality required to send requests to the server 102 and to receive and process responses from the server 102.

The end-user client device 104 and the auditor client device 105 are each generally intended to encompass any client computing device such as a laptop/notebook computer, wireless data port, smart phone, personal data assistant (PDA), tablet computing device, one or more processors within these devices, or any other suitable processing device. For example, a client device may comprise a computer that includes an input device, such as a keypad, touch screen, or other device that can accept user information, and an output device that conveys information associated with the operation of the server 102, or the respective client device itself, including digital data, visual information, or a GUI 162 or 163.

The GUI 162 and the GUI 163 each interface with at least a portion of the system 100 for any suitable purpose, including generating a visual representation of the expense report application 110 or the audit application 121, respectively. In particular, the GUI 162 and the GUI 163 may each be used to view and navigate various Web pages. Generally, the GUI 162 and the GUI 163 each provide a respective user with an efficient and user-friendly presentation of data provided by or communicated within the system. The GUI 162 and the GUI 163 may each comprise a plurality of customizable frames or views having interactive fields, pull-down lists, and buttons operated by the user. The GUI 162 and the GUI 163 each contemplate any suitable graphical user interface, such as a combination of a generic web browser, intelligent engine, and command line interface (CLI) that processes information and efficiently presents the results to the user visually.

Memory 164 and memory 165 included in the end-user client device 104 and the auditor client device 105 may each include any memory or database module and may take the form of volatile or non-volatile memory including, without limitation, magnetic media, optical media, random access memory (RAM), read-only memory (ROM), removable media, or any other suitable local or remote memory component. The memory 164 and the memory 165 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104, auditor client devices 105, fraudulent entities 106a, and valid entities 106b associated with, or external to, the system 100. Further, the term "client," "client device," and "user" may be used interchangeably as appropriate without departing from the scope of this disclosure. Moreover, while client devices may be described in terms of being used by a single user, this disclosure contemplates that many users may use one computer, or that one user may use multiple computers.

FIG. 2A illustrates an example process 200 for generating a document generator footprint. In an input stage 202, generated documents 204 previously generated by a document generator are identified. A processing stage 206 includes processing steps 208. The processing steps 208 include calculation of a histogram of color values for each generated document. The histograms are evaluated to determine common colors present in the generated documents. An output stage 210 includes providing the common colors 212, for example, to an inference engine.

Figure 2B:
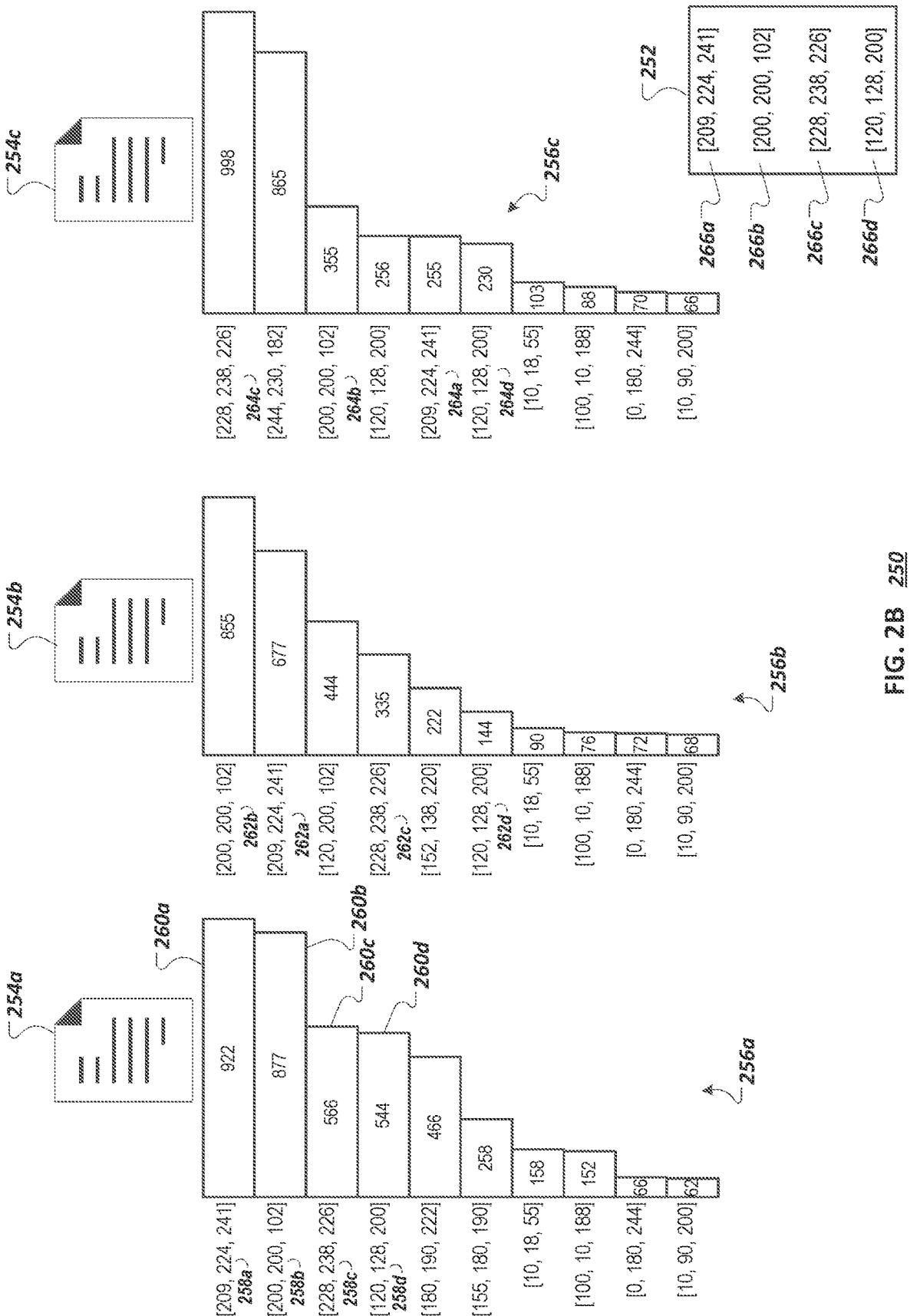
FIG. 2B is a diagram that illustrates generation of a footprint for a particular document generator.

FIG. 2B is a diagram 250 that illustrates generation of a footprint 252 for a particular document generator. In the example of FIG. 2B, the footprint 252 is generated based on colors of three documents (e.g., documents 254a, 254b, and 254c) known to have been generated by the particular document generator. Although three documents are shown, a footprint can be generated from a set of documents that includes more than three documents.

For each of the document 254a, the document 254b, and the document 254c, a respective histogram 256a, 256b, or 256c can be generated. Each of the histograms 256a, 256b, and 256c represent counts of most-frequently occurring colors included in a respective document 254a, 254b, or 254c. Each of the histogram 256a, 256b, and 256c include counts of the top ten most-occurring colors in a respective document 254a, 254b, or 254c. Although a value of ten is used as a count of top-occurring color values, a value other than ten can be used. A top N (e.g., top 10) most frequent colors, as illustrated by the histograms 256a, 256b, and 256c, can represent footprints of particular documents (e.g., documents 254a, 254b, and 254c).

The histograms 256a, 256b, and 256c include counts for color values that are represented by three values, representing Red, Green, and Blue values of pixels in a respective document. Other types of color values can be used. For example, for grayscale documents, a single number representing a single intensity value may be used. In some cases, four values may be used (e.g., representing RGB (Red, Green, Blue) and a fourth alpha value representing transparency). In some cases, generation of the histograms 256a, 256b, and 256c includes ignoring color values that represent black (e.g., RGB(0,0,0) and/or white (e.g., RGB(255, 255, 255)).

Generation of the footprint 252 can include determining whether at least k (e.g., 4) colors appear in each of the histograms 256a, 256b, and 256c (or appear in each histogram with at least a threshold frequency). If at least k colors appear in each of the histograms 256a, 256b, and 256c, then the footprint 252 can include k colors, as shown.

In the example of FIG. 2B, the histogram 256a includes four top colors 258a, 258b, 258c, and 258d, with corresponding counts of 260a, 260b, 260c, and 260d, respectively. Each of the colors 258a, 258b, 258c, and 258d occur in both the histogram 256b and the histogram 256c. For example, the color 258a is included in the histogram 256b as color 262a and in the histogram 256c as color 264a, the color 258b is included in the histogram 256b as color 262b and in the histogram 256c as color 264b, the color 258c is included in the histogram 256b as color 262c and in the histogram 256c as color 264c, and the color 258d is included in the histogram 256b as color 262d and in the histogram 256c as color 264d.

Accordingly, the footprint 252 includes a color 266a (matching the colors 258a, 262a, and 264a), a color 266b (matching the colors 258b, 262b, and 264b), a color 266c (matching the colors 258c, 262c, and 264c), and a color 266d (matching the colors 258d, 262d, and 264d). The colors in the footprint 252 can be referred to as template colors for the document generator (e.g., colors generally included in documents generated by the document generator). The footprint 252, therefore, represents a footprint for the document generator itself. The footprint 252 can be used in an inference phase, as described below.

Figure 3:
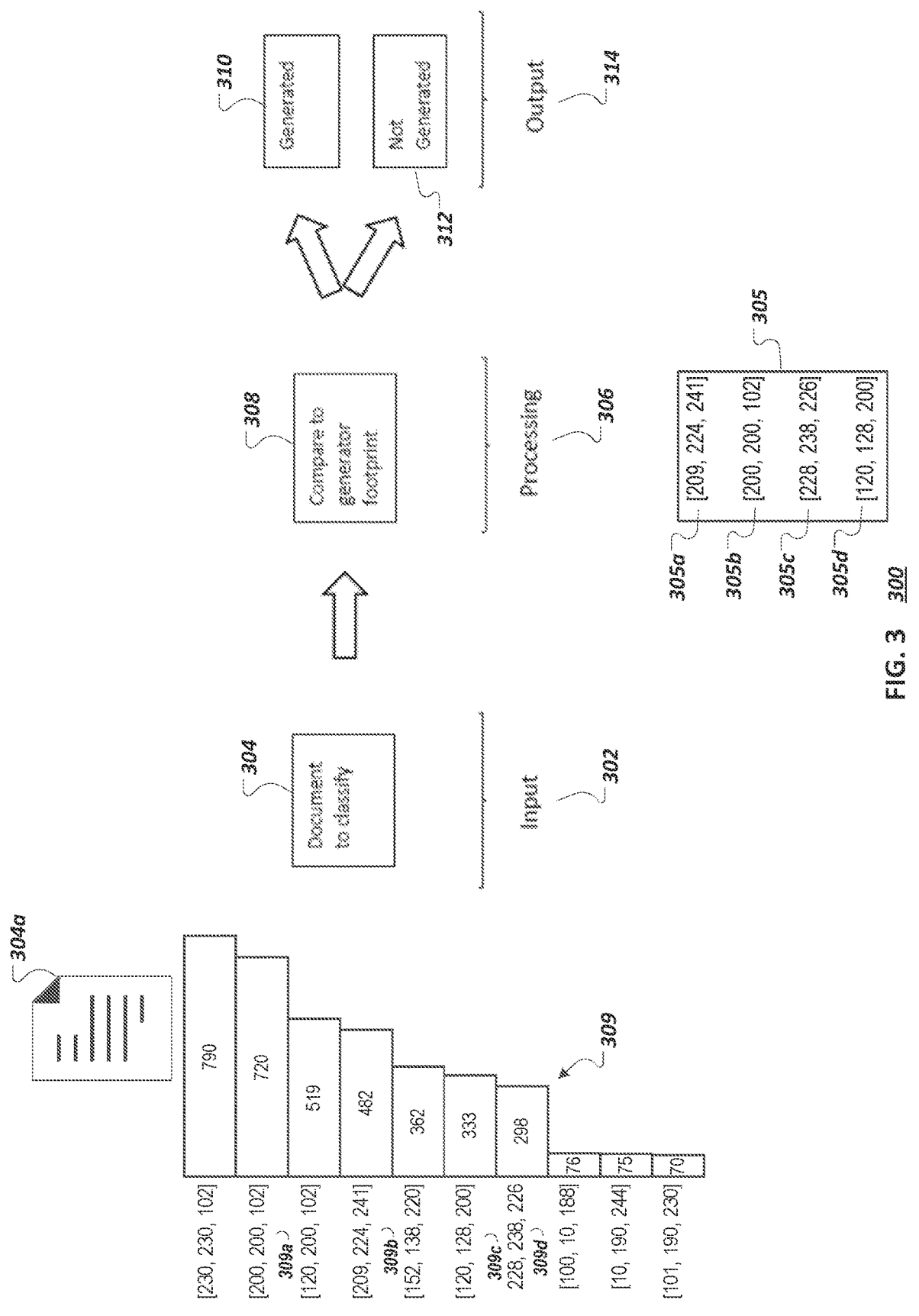
FIG. 3 illustrates an example system for determining whether a document has been generated by a particular document generator.

FIG. 3 illustrates an example system 300 for determining whether a document has been generated by a particular document generator. In an input stage 302, a document to classify 304 (e.g., a document 304*a*) is identified. The input stage 302 can also include identifying a generator footprint 305 (e.g., common colors) of a document generator generated during a learning phase, as described above. The generator footprint 305 includes colors 305*a*, 305*b*, 305*c*, and 305*d*.

A processing (e.g., inference) stage 306 includes a comparison step 308 of comparing top colors 309 in the document to classify 304 to the generator footprint. The top colors 309 can include a top N (e.g., 10) occurring colors in the document to classify 304. The comparison step 308 can include determining whether each of the colors 305*a*, 305*b*, 305*c*, and 305*d* in the generator footprint 305 are included in the top colors 309 of the document to classify 304. For example, colors 309*a*, 309*b*, 309*c*, and 309*d* correspond to (e.g., have the same color values as) the colors 305*b*, 305*a*, 305*d*, and 305*c*, respectively.

In general, a result of the comparison can be either a generated classification 310 (e.g., indicating the document to classify 304 was likely generated by the document generator) or a not-generated classification 312 (e.g., indicating the document to classify 304 was not likely generated by the document generator. For instance, for the document 304*a*, since each of the colors in the footprint 305 are included in the top colors 309, the generated classification 310 can be applied to the document 304*a*.

An output stage 314 can include providing either the generated classification 310 or the not-generated classification 312 to a receiving system, process, or user. The process can be repeated for the document to classify 304 for multiple different document generators.

In some implementations, each run of the process for a given generator can produce a likelihood that the document was generated by the given generator. A generator with a highest likelihood can be identified and a determination can be made that the generator with the highest likelihood is a generator that was used to generate the document, if the likelihood for that generator is more than a threshold. For example, the threshold may be 90%. For a first document, likelihoods of 92%, 65%, and 5% may be generated for generators A, B, and C. The generator A may be identified as a generator that generated the document, based on the generator A having a highest likelihood and the likelihood for the generator A being more than the threshold of 90%.

A probability of a false positive computation of the generated classification 310 can be determined. For example, the probability can be calculated using formula (1) shown below, assuming that m represents a number of possible color values (e.g., 256 for grayscale, $256^3$ for RGB values), n represents a number of top colors to determine for each generated document (e.g., 10, 15), and k represents a number of colors that are common in the top-n colors of each generated document (e.g., 4).

$$\text{probability of false positive} = \frac{n! \cdot (m-k)!}{(n-k)! \cdot m!} \quad (1)$$

As an example, assuming m=256, n=15, and k=4, the probability for a false positive (e.g., a random match of a document footprint to a footprint of a given document generator) can be calculated as shown below in equation (2):

$$\frac{15! \cdot (256-4)!}{(15-4)! \cdot 256!} = \frac{15 \cdot 14 \cdot 13 \cdot 12}{256 \cdot 255 \cdot 254 \cdot 253} \approx \frac{8}{1,000,000} < \frac{1}{100,000} \quad (2)$$

In some implementations, other information can be used, along with the generated classification 310, to determine whether a given document is likely to be generated by a given document generator. For example, other document attributes, such as document size, can be used for comparison. For example, if the document generator is known to generate documents of particular size(s), (e.g., a certain number of pixels), the processing 306 can include first comparing the size of the document to classify 304 to the known document size(s) of documents generated by the document generator, and if the size of the document to classify 304 matches a known document size, then comparing the footprint of the document to classify 304 to the footprint 305 of the document generator. When other document attributes (e.g., document size) are compared, a probability of a false positive can be even less than illustrated in equations (1) and (2) above.

FIG. 4 is a flowchart of an example method 400 for determining whether a document has been generated by a particular document generator.

At 402, multiple generated documents generated by a document generator are retrieved from a repository.

At 404, common colors in a top N appearances of colors in the generated documents are calculated. For example, N can be 10, and the common colors can be a set of top (e.g., 4) common colors that most-commonly appear in the 10 most common colors of respective generated documents.

At 406, the common colors are saved as a footprint for the generator.

At 408, a top N colors are calculated for a new document (e.g., a document to classify).

At 410, a determination is made as to whether the top N colors of the new document match the footprint of the document generator. For example, a determination can be made that the top N colors of the new document match the footprint of the document generator if the top N colors of the new document include each of the colors in the footprint of the generator.

If the top N colors of the new document match the footprint of the document generator, a classification of generated-document 412 (e.g., generated by the document generator) can be assigned to the new document. If the top N colors of the new document do not match the footprint of the document generator, a classification of not-generated-document 414 (e.g., not generated by the document generator) can be assigned to the new document.

FIG. 5 is a flowchart of an example method for identifying document generators by color footprints. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the server 102 of FIG. 1.

At 502, a set of training documents generated by a document generator is identified. The set of training documents can include a predetermined number of documents (e.g., 5, 10, 20). Each training document can be a document is that known to have been generated by the document generator. The training documents can be images, such as receipt images.

At 504, a document footprint is determine for each respective training document that includes a set of most frequently occurring color values in the respective training document. Color values can be RGB color values, grayscale color values, or some other type of color value. For example, a color value can include RGB values plus a fourth alpha value representing transparency. The color values can be color values of image pixels.

Generating the document footprint for a respective training document can include: generating, for the respective training document, a histogram of frequency counts of color values included in the respective training document; sorting, for the respective training document, the histogram of frequency counts of color values included in the respective training document by color value frequency count; and determining the set of most frequently occurring color values in the respective training document based on a sorted histogram for the respective training document.

At 506, a document generator footprint is generated by determining, based on document footprints of the set of training documents, a set of common color values that occur in the set of training documents. Generating the document generator footprint can include determining, as the set of common color values, a set of color values that are included in each document footprint of the set of training documents.

At 508, a request to classify a first document is received. The request can correspond to an audit of the first document, for example.

At 510, a document footprint is generated for the first document that includes a set of most frequently occurring color values in the first document.

At 512, a classification for the first document is determined as either generated-by-the-document-generator or not-generated-by-the-document-generator based on comparing the document footprint for the first document to the document generator footprint. Comparing the document footprint for the first document to the document generator footprint can include determining whether each color value in the document generator footprint is included in the document footprint for the first document.

At 514, the classification for the first document is provided in response to the request. In some implementations, in response to determining the classification of not-generated-by-the-document-generator, the document footprint for the first document is compared to another document generator footprint of another document generator to determine whether the first document was likely generated by the other document generator.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure

What is claimed is:

1. A computer-implemented method, comprising:

training, in a training phase, a document generator detector, wherein the training includes training the document generator detector to detect whether input documents are generated by any particular document generator of multiple different known document generators including known valid document generators and known fraudulent document generators, and wherein the training includes, for each given known document generator of the multiple different known document generators:

identifying a set of training documents that are each generated by the given known document generator and not by any other different document generators in the multiple different known document generators;

determining, for each respective training document generated by the given known document generator, a document footprint for the respective training document that includes a set of most frequently occurring color values in the respective training document; and generating a document generator footprint for the given known document generator by determining, based on multiple document footprints of the set of training documents generated by the given known document generator, a set of common color values that occur in the multiple document footprints of the set of training documents generated by the given known document generator;

receiving, in an inference phase, after document generator footprints are generated for the multiple different known document generators during the training phase, a request to classify a first document;

generating a document footprint for the first document that includes a set of most frequently occurring color values in the first document;

determining a classification for the first document that indicates whether the first document was generated by a first known document generator of the multiple different known document generators based on comparing the document footprint for the first document to the document generator footprint for the first known document generator;

in response to determining that the classification for the first document indicates that the first document was generated by the first known document generator:

providing an audit alert in response to the request, in response to determining that the first known document generator is a known fraudulent generator; and providing an audit pass indication, in response to the request, in response to determining that the first known document generator is a known valid document generator; and in response to determining that the classification for the first document indicates that the first document was not generated by the first known document generator:

identifying a next known document generator from the multiple different known document generators; and generating a next classification for the first document that indicates whether the first document was generated by the next known document generator.

2. The computer-implemented method of claim 1, wherein color values are RGB (red, green, blue) color values.

3. The computer-implemented method of claim 2, wherein color values include RGB color values and a fourth alpha value that represents transparency.

4. The computer-implemented method of claim 1, wherein color values are grayscale values.

5. The computer-implemented method of claim 1, wherein the set of training documents and the first document are images.

6. The computer-implemented method of claim 5, wherein the training documents and the first document are receipt images.

7. The computer-implemented method of claim 5, wherein the color values are color values of image pixels.

8. The computer-implemented method of claim 1, wherein comparing the document footprint for the first document to the document generator footprint for the first known document generator includes determining whether each color value in the document generator footprint for the first known document generator is included in the document footprint for the first document.

9. The computer-implemented method of claim 1, wherein the set of common color values that occur in the set of training documents includes a predetermined number of most common color values that occur in the set of training documents.

10. The computer-implemented method of claim 1, wherein determining the document footprint for the respective training document comprises:

generating, for the respective training document, a histogram of frequency counts of color values included in the respective training document;

sorting, for the respective training document, the histogram of frequency counts of color values included in the respective training document by color value frequency count; and determining the set of most frequently occurring color values in the respective training document based on a sorted histogram for the respective training document.

11. The computer-implemented method of claim 1, wherein generating the document generator footprint for the first known document generator comprises determining, as the set of common color values, a set of color values that are included in each document footprint of the set of training documents.

12. A system comprising:

one or more computers; and a computer-readable medium coupled to the one or more computers having instructions stored thereon which, when executed by the one or more computers, cause the one or more computers to perform operations comprising:

training, in a training phase, a document generator detector, wherein the training includes training the document generator detector to detect whether input documents are generated by any particular document generator of multiple different known document generators including known valid document generators and known fraudulent document generators, and wherein the training includes, for each given known document generator of the multiple different known document generators:

identifying a set of training documents that are each generated by the given known document generator and not by any other different document generators in the multiple different known document generators;

determining, for each respective training document generated by the given known document generator, a document footprint for the respective training document that includes a set of most frequently occurring color values in the respective training document; and generating a document generator footprint for the given known document generator by determining, based on multiple document footprints of the set of training documents generated by the given known document generator, a set of common color values that occur in the multiple document footprints of the set of training documents generated by the given known document generator;

receiving, in an inference phase, after document generator footprints are generated for the multiple different known document generators during the training phase, a request to classify a first document;

generating a document footprint for the first document that includes a set of most frequently occurring color values in the first document;

determining a classification for the first document that indicates whether the first document was generated by a first known document generator of the multiple different known document generators based on comparing the document footprint for the first document to the document generator footprint for the first known document generator;

in response to determining that the classification for the first document indicates that the first document was generated by the first known document generator:

providing an audit alert, in response to the request, in response to determining that the first known document generator is a known fraudulent generator; and providing an audit pass indication, in response to the request, in response to determining that the first known document generator is a known valid document generator; and in response to determining that the classification for the first document indicates that the first document was not generated by the first known document generator:

identifying a next known document generator from the multiple different known document generators; and generating a next classification for the first document that indicates whether the first document was generated by the next known document generator.

13. The system of claim 12, wherein comparing the document footprint for the first document to the document generator footprint for the first known document generator includes determining whether each color value in the document generator footprint for the first known document generator is included in the document footprint for the first document.

14. The system of claim 12, wherein the set of common color values that occur in the set of training documents includes a predetermined number of most common color values that occur in the set of training documents.

15. The system of claim 12, wherein determining the document footprint for the respective training document comprises:

generating, for the respective training document, a histogram of frequency counts of color values included in the respective training document;

sorting, for the respective training document, the histogram of frequency counts of color values included in the respective training document by color value frequency count; and determining the set of most frequently occurring color values in the respective training document based on a sorted histogram for the respective training document.

16. A computer program product encoded on a non-transitory storage medium, the product comprising non-transitory, computer readable instructions for causing one or more processors to perform operations comprising:

training, in a training phase, a document generator detector, wherein the training includes training the document generator detector to detect whether input documents are generated by any particular document generator of multiple different known document generators including known valid document generators and known fraudulent document generators, and wherein the training includes, for each given known document generator of the multiple different known document generators:

identifying a set of training documents that are each generated by the given known document generator and not by any other different document generators in the multiple different known document generators;

determining, for each respective training document generated by the given known document generator, a document footprint for the respective training document that includes a set of most frequently occurring color values in the respective training document; and generating a document generator footprint for the given known document generator by determining, based on multiple document footprints of the set of training documents generated by the given known document generator, a set of common color values that occur in the multiple document footprints of the set of training documents generated by the given known document generator;

receiving, in an inference phase, after document generator footprints are generated for the multiple different known document generators during the training phase, a request to classify a first document;

generating a document footprint for the first document that includes a set of most frequently occurring color values in the first document;

determining a classification for the first document that indicates whether the first document was generated by a first known document generator of the multiple different known document generators based on comparing the document footprint for the first document to the document generator footprint for the first known document generator;

in response to determining that the classification for the first document indicates that the first document was generated by the first known document generator:

providing an audit alert, in response to the request, in response to determining that the first known document generator is a known fraudulent generator; and providing an audit pass indication, in response to the request, in response to determining that the first known document generator is a known valid document generator; and in response to determining that the classification for the first document indicates that the first document was not generated by the first known document generator:

identifying a next known document generator from the multiple different known document generators; and generating a next classification for the first document that indicates whether the first document was generated by the next known document generator.

17. The computer program product of claim 16, wherein comparing the document footprint for the first document to the document generator footprint for the first known document generator includes determining whether each color value in the document generator footprint for the first known document generator is included in the document footprint for the first document.

18. The computer program product of claim 16, wherein the set of common color values that occur in the set of training documents includes a predetermined number of most common color values that occur in the set of training documents.

19. The computer program product of claim 16, wherein determining the document footprint for the respective training document comprises:

generating, for the respective training document, a histogram of frequency counts of color values included in the respective training document;

sorting, for the respective training document, the histogram of frequency counts of color values included in the respective training document by color value frequency count; and determining the set of most frequently occurring color values in the respective training document based on a sorted histogram for the respective training document.

20. The computer-implemented method of claim 1, wherein the first known document generator comprises a known fraudulent document generator of a known fraudulent entity known to generate fraudulent documents.

21. The computer-implemented method of claim 1, wherein the first known document generator comprises a known valid document generator of a known valid entity known to generate valid documents.

\* \* \* \* \*